G. CONSTANTINESCO.
ALTERNATING LIQUID CURRENT MOTOR.
APPLICATION FILED AUG. 25, 1921.
1,432,672.
Patented Oct. 17, 1922.
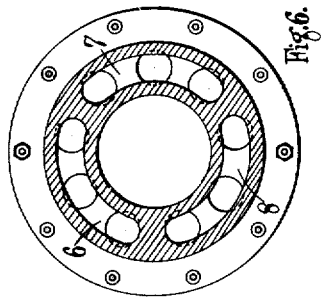
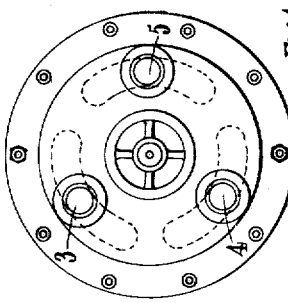
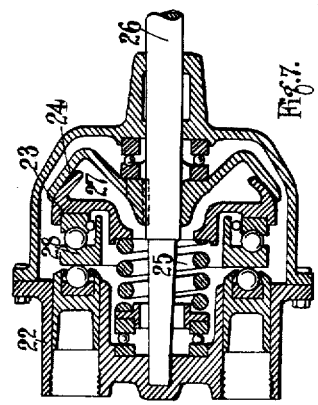
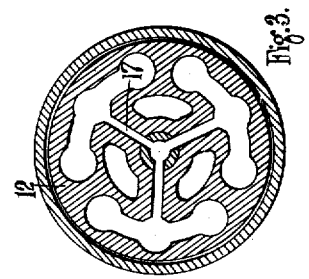
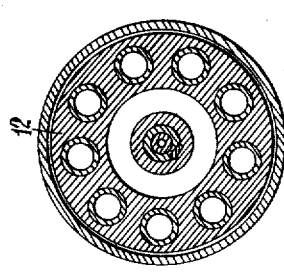
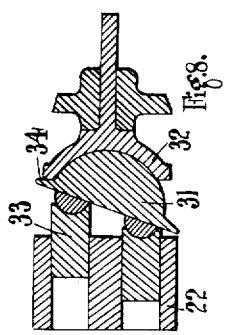
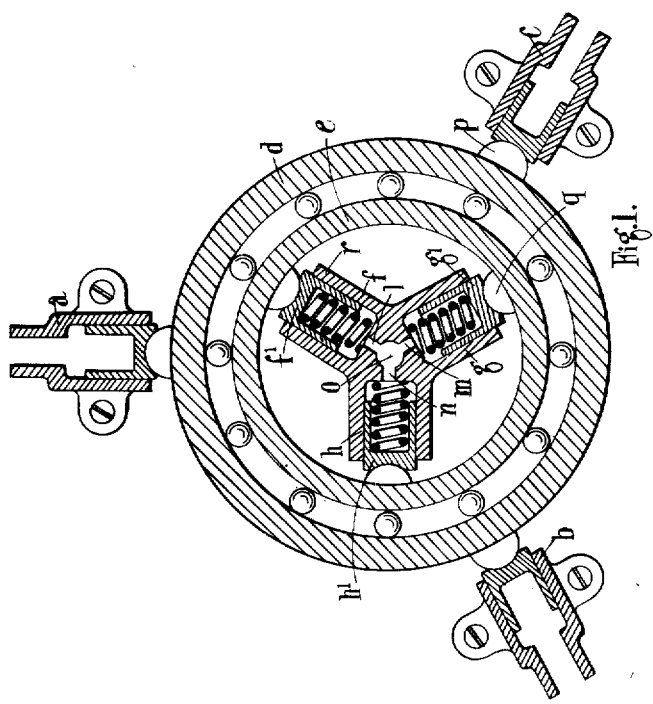
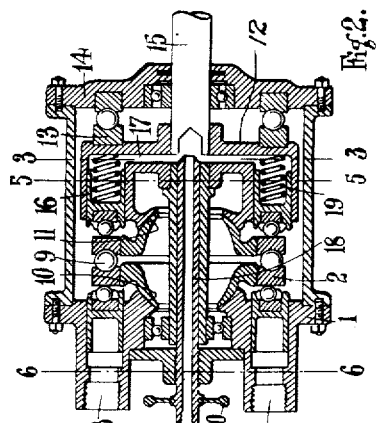
INVENTOR
G. Constantinesco
by
Attorney

Patented Oct. 17, 1922.

1,432,672

UNITED STATES PATENT OFFICE.

GEORGE CONSTANTINESCO, OF WEYBRIDGE, ENGLAND, ASSIGNOR TO WALTER HADDON, OF LONDON, ENGLAND.

ALTERNATING LIQUID CURRENT MOTOR.

Application filed August 25, 1921. Serial No. 495,221.

(GRANTED UNDER THE PROVISIONS OF THE ACT OF MARCH 3, 1921, 41 STAT. L., 1313.)

*To all whom it may concern:*

Be it known that I, GEORGE CONSTANTINESCO, a subject of the King of Great Britain and Ireland, residing at Carmen Sylva, Beechwood Avenue, Oatlands Park, Weybridge, in the county of Surrey, England, have invented certain new and useful Improvements in Alternating Liquid Current Motors (for which I have filed an application in Great Britain Oct. 3, 1916, Patent No. 110,003), of which the following is a specification.

The present invention relates to motors operated by alternating liquid currents of the kind described in the specification of Letters Patent Reissue No. 14738, and has for its object the construction of asynchronous rotary motors actuated by such currents. The term alternating liquid current is defined in specification of Patent No. 1334290.

It will be readily seen that if an eccentric is situated on a shaft, and cylinders and pistons are arranged around the eccentric at angles of 120 degrees apart, and if these pistons are acted on by alternating liquid vibrations also differing in phase by 120 degrees, the effect of the liquid vibrations acting on the pistons is to produce as it were a series of impulses exerted in order about the axis of the shaft acting on the eccentric in a direction parallel with the shaft and exerting a torque if the shaft is made to rotate initially at the synchronous speed.

Such motors have been described in Letters Patent Serial No. 1211679 and Letters Patent Reissue No. 14738. It will be seen, however, that such a motor will not start, and will not exert a torque, unless running at the synchronous speed.

The present invention consists in an asynchronous motor actuated by polyphase alternating liquid currents.

The invention further consists in a rotary motor comprising a stator, transmitter and rotor, the rotor being provided with means allowing it to slip relatively to the rotating impulses, such slip being effected against a resistance.

The invention further consists in a rotary motor comprising a stator, transmitter, rotor, reactance and collector, the collector consisting of a short-circuiting device carried by the rotor itself, while the reactance is also carried by the rotor, and consists in a suitable elastic supporting device.

The invention also consists in a motor comprising a stator having three cylinders placed at 120 degrees apart, with pistons working in such cylinders, and actuated by three phases of an alternating three-phase wave transmission system, the transmitter comprising rings interposed between the stator pistons and the pistons of the rotor, such rotor pistons working in cylinders against the action of springs and a resistance, such as that of liquid pumped through small apertures.

The invention further consists in adjustably restricting the passages through which liquid in the rotor is pumped.

The invention further consists in the improved constructions of asynchronous motor hereinafter described.

It will be seen that very many different forms of motor can be constructed and that many different applications and combinations of the machine are possible, as is the case in asynchronous induction polyphase electric motors. The motor is analogous to the electric motor of this type, and is analogous thereto in its many applications.

Referring to the accompanying diagrammatic drawings:

Figure 1 is a section of the motor constructed according to the invention;

Figure 2 is an axial section of a modified form of three-phase asynchronous motor;

Figure 3 is a section on the line 3—3, Figure 2;

Figure 4 is an end elevation of the motor shown in Figure 2;

Figure 5 is a section on the line 5—5, Figure 2.

Figure 6 is a section of the outer part of the stator on the line 6—6, Figure 2;

Figure 7 is an axial section of a simple form of asynchronous motor suitable for low powers;

Figure 8 is an axial section of a modified form.

In the form of the invention shown in Figure 1, the stator comprises three cylinders, *a*, *b*, *c*, which are connected to the three phases of a three-phase wave transmission line. The transmitter is formed by an ordinary ball bearing, whose outer ring $d$, is acted on by the stator pistons through ball segments $p$ slidable in the pistons and on the ring $d$, and the inner ring $e$ transmits pressure to the rotor pistons through ball segments $q$ slidable in the pistons and on the ring $e$. The rotor $r$ comprises three cylinders $f$, $g$, $h$, in which the pistons $f^1$, $g^1$, $h^1$ work against springs. The space within the pistons is filled with liquid or viscous material. The reactance of the rotor is provided by the three springs on which the pistons work. The three cylinders $f$, $g$, $h$, are connected by narrow passages $l$, $m$, $n$, with a central common chamber $o$.

With a motor as above described, if the cylinders $a$, $b$, $c$, be connected to the three alternating liquid columns of a three-phase wave transmission system, the centre of the transmitter rings $d$, $e$, will be displaced, the displacement being constant in magnitude, and rotating around the centre of the stator.

It will be seen that the cylinders of the rotor are only free to rotate round the centre of figure of the cylinders $f$, $g$, $h$, while the pistons $f^1$, $g^1$, $h^1$, follow the movements of the ring $e$ of the transmitter. The relative movement of the pistons $f^1$, $g^1$, $h^1$, to the cylinders $f$, $g$, $h$, will therefore pump the liquid contained in the rotor cylinders through the small passages $l$, $m$, $n$.

It can be shown by mathematical analysis that the frictional resistance to the flow of liquid through the narrow channels $l$, $m$, $n$, and the pressure of the springs, and the liquid pressures in the rotor cylinders, will give a resultant torque on the rotor cylinders which is constant in direction and magnitude. The rotor therefore will start rotating with an angular velocity smaller than the angular velocity of the rotating displacement of the transmitter. The rotor further will be capable of developing a torque. The result is that the rotor rotates in the same direction as the rotating displacement, due to the stator pistons, which displacement may be regarded as a rotating mechanical field, due to the stator. The rotor, however, always has a slip relatively to the rotating field, which is due to the pumping of liquid by the pistons of the rotor through the restricted passages $l$, $m$, $n$, into and out of the common chamber $o$. By diminishing the section of the passages $l$, $m$, $n$, the slip may be reduced indefinitely, until the speed of the rotor approaches very nearly to the synchronous speed of the rotating field. The torque obtained from the motor is nearly the same as the torque obtained from the equivalent motor having a rotor with an ordinary eccentric, the eccentricity of which would be determined by the strength of the springs used in the rotor. The drop in efficiency, as compared with fixed eccentric motors, will be determined by the slip. For efficiency, therefore, it follows that the slip should be kept as small as possible by decreasing the passages $l$, $m$ and $n$.

On the other hand, if the passages $l$, $m$, and $n$ are very small, the starting torque of the motor is also small, and to obtain a powerful starting torque, the passages $l$, $m$ and $n$ must be increased. This can be effected by closing the passages $l$, $m$, $n$, more or less, according to the speed of the motor, by a suitable plug worked from the outside.

According to another form of the invention, the flow from each of the three cylinders of the rotor may be collected by means of a suitable collector outside the rotor.

In the form of the invention shown in Figure 2, the stator 1 is provided with three pistons for each phase. These pistons are operated in order around the circumference, producing the rotating field acting on the transmitter 2. The three phases of the transmission line are connected to the three inlets 3, 4, 5, each of which communicates with three of the pistons of the stator by the passages 6, 7, 8, Figure 6. The transmitter consists of a bearing 9 supported on spherical surfaces 10, 11, on the stator and rotor respectively. The rotor 12 is also provided with nine pistons, arranged in groups of three, and is supported longitudinally by a thrust bearing 13 between it and the back plate 14 of the stator. The rotor 12 is suitably keyed to the shaft 15, and its cylinders 16 communicate with a hollow in the shaft by the passages 17. A hollow adjustable valve spindle 18 is provided, which enters the hollow shaft, and is adapted to more or less close the communication between the cylinders of the rotor. The rotor pistons are pressed against the transmitter by springs 19. The valve spindle 18 is adjustable from the outside of the motor by the hand wheel 20, and is formed with a taper end, so that as the spindle is screwed in or out, it adjusts the apertures of the passages connecting the rotor cylinders, and thus adjusts the friction opposed to the movement of the rotor pistons. A connection is provided at the outer end of the spindle 18, to a constant pressure device pumping liquid into the rotor cylinders at a constant pressure, so that the mean pressure is kept high enough to ensure that the cylinders are always full of liquid. The liquid required for this purpose may be taken from the line by which the stator is fed by long pipes of very small bore, sufficiently long to avoid waste of energy. In larger sized machines, it is convenient to fit a pump to the motor, for maintaining a constant pressure in the rotor, by means of oil, which also effects the lubrication.

When starting a motor according to this modification, in order to obtain a large starting torque, the handle 20 must be turned so as to open as far as necessary the passages 17 connecting the rotor cylinders. When the motor has attained a normal speed, the handle will be turned so as to partially close these passages until the slip is reduced to the minimum practicable.

It will be seen that the ball bearings illustrated may be replaced by other anti-friction bearing surfaces, and other devices may be used to avoid friction. Further, it is desirable that good ventilation should be provided in order to dissipate the heat generated in the rotor when working with considerable slip. The lubricating oil may be circulated by a pump to effect cooling of the rotor if desired.

In the form of the invention shown in Figure 7, the cylinders and pistons in the rotor are dispensed with. In this form of the invention, the three phases are connected to the stator 22, actuating three pistons which communicate motion to the oscillating body 23, which is in frictional contact with the rotor 24 over the spherical surface between them, and is acted on by a spring 25, which tends to keep it normal to the axis of the motor. The rotor 24 is suitably keyed to the shaft 26. In this case the reactance is provided by the spring 25. In this case a general ball bearing 27 is also provided, to keep co-axial the parts 23 and 28.

The working of the motor shown in Figure 7 is as follows:—The rotating field produced by the pulsations of the three phase alternating current in the stator 22 causes the deflection of the plane of the front face of the part 28, which is thus inclined to its normal position at right angles to the axis of the motor, the line of maximum inclination in this plane rotating uniformly about the axis. This inclination is effected against the action of the spring 25, which thus produces the necessary reactance on the members 23, 28. The friction between the members 23 and 24 operates in a similar manner to the liquid friction in the modifications above described, with the result that a torque is produced, acting on the member 24, causing the shaft 26 to rotate. The friction between the parts 23 and 24 should be sufficient to prevent unduly large slip.

In the examples given above, only three phase motors have been described. It will be seen, however, that similar constructions can be adopted for any number of phases.

Further, the stator may be worked by an $n$-phase line, and the rotor may be an $m$-phased rotor. The friction device shown in Figure 7 corresponds to an infinite number of phases in the rotor and a limited number of phases in the stator. In order to get a continuous torque, however, three phases at least are necessary. If two phases only were employed, the motor would revolve if initially turned in one direction or the other. The torque, however, would not be constant, but of a pulsating nature. With three or more phases, however, the torque is constant and in one direction. In order to reverse a motor constructed according to this invention, it is only necessary to interchange the phases in the stator by a suitable reversing switch.

In a modified form of motor shown in Figure 8 instead of using a spring as a reactance in order to limit the inclination of the oscillating member, the reactance may be provided by friction between the transmitter 31 and the rotor 32. The limitation of the stroke of the stator pistons 33 is provided for by the flange 34 which bears against the rotor at one point. The necessary friction arises from the pressure of the pistons in the axial direction transmitted through the transmitter to the rotor 32. A thrust bearing may, if desired, be interposed between the pistons 33 and the flange 34 as in the modifications described above.

It will be seen that with motors as above described the maximum torque possible is the torque which is obtained at synchronous speed, that is, when the slip is zero, and it is not possible to obtain the higher torque on starting. The speed of motors according to this invention also cannot exceed synchnonous speed equal to that of the generator producing the wave motion in the transmission line.

It should be understood that the maximum torque on starting asynchronous motors according to the invention is a function of the resistance and capacity of the rotor circuit. If the resistance is diminished below a certain limit, the starting torque diminished instead of increasing. Similarly, in a monophase motor constructed similarly to that above described but with two pistons instead of three, there is a certain critical relation between resistance and reactance at which with a very slight impulse the rotor will immediately be caused to rotate. This property can be made use of in adjusting the resistance in such a machine by means of a suitable plug, as above described, so as to obtain that value of resistance at which the motor will start easily with a very small impulse.

I claim:

1. An asynchronous rotary alternating liquid pressure motor comprising in combination; a stator; a transmitter; means for imparting impulses to said transmitter successively, producing a rotating mechanical field; a rotor; and non-rigid connecting means allowing slip between said rotor and said rotating mechanical field and means opposing resistance to said slip as set forth.

2. An asynchronous rotary alternating liquid pressure motor; comprising a stator, a transmitter, a rotor having pistons, a reactance and a collector, said collector comprising a chamber inside said rotor and passages leading from said chamber to said pistons, while said reactance comprises a non-rigid mechanical connection permitting slip.

In testimony whereof I have signed my name to this specification.

GEORGE CONSTANTINESCO.

Witnesses:
JAS. E. ALLSOP,
W. F. M. ADAMS.

Certificate of Correction.

It is hereby certified that Letters Patent No. 1,432,672, granted July 25, 1922, upon the application of John Lewis Milton, of Cleveland, Ohio, for an improvement in "Magneto-Ignition Systems for Internal-Combustion Engines," were erroneously issued to "The Teagle Company, of Cleveland, Ohio, a Corporation of Ohio," whereas said Letters Patent should have been issued to *Motor Ignition & Devices Company, a Corporation of West Virginia*, said corporation being assignee, by *mesne assignments*, of the entire interest in said invention, as shown by the records of assignments in this office; and that the said Letters Patent should be read with this correction therein that the same may conform to the record of the case in the Patent Office.

Signed and sealed this 26th day of December, A. D., 1922.

[SEAL.]
KARL FENNING,
*Acting Commissioner of Patents.*